(12) United States Patent
Lasser (10) Patent No.: US 8,341,371 B2
(45) Date of Patent: Dec. 25, 2012

(54) METHOD OF MANAGING COPY OPERATIONS IN FLASH MEMORIES

(75) Inventor: Menahem Lasser, Kohav Yair (IL)

(73) Assignee: SanDisk IL Ltd, Kfar Saba (IL)

( * ) Notice: Subject to any disclaimer, the term of this patent is extended or adjusted under 35 U.S.C. 154(b) by 899 days.

(21) Appl. No.: 11/219,826

(22) Filed: Sep. 7, 2005

(65) Prior Publication Data
US 2007/0220197 A1    Sep. 20, 2007

Related U.S. Application Data (60) Provisional application No. 60/647,945, filed on Jan. 31, 2005.

(51) Int. Cl.
*G06F 12/00* (2006.01)

(52) U.S. Cl. ........ 711/165; 711/103; 711/160; 711/161; 711/E12.008

(58) Field of Classification Search .................... 711/165
See application file for complete search history.

(56) References Cited

U.S. PATENT DOCUMENTS

| | | | |
|---|---|---|---|
| 5,404,485 A | 4/1995 | Ban | |
| 5,539,895 A * | 7/1996 | Bishop et al. | 711/138 |
| 5,592,625 A * | 1/1997 | Sandberg | 711/147 |
| 5,617,537 A * | 4/1997 | Yamada et al. | 709/214 |
| 5,696,917 A * | 12/1997 | Mills et al. | 711/1 |
| 5,740,395 A * | 4/1998 | Wells et al. | 711/103 |
| 5,740,396 A * | 4/1998 | Mason | 711/103 |
| 5,771,191 A * | 6/1998 | Matsue | 365/185.09 |
| 5,937,425 A | 8/1999 | Ban | |
| 6,000,006 A * | 12/1999 | Bruce et al. | 711/103 |
| 6,026,465 A * | 2/2000 | Mills et al. | 711/103 |
| 6,223,290 B1 * | 4/2001 | Larsen et al. | 726/3 |
| 6,282,700 B1 * | 8/2001 | Grover et al. | 717/170 |
| 6,385,688 B1 * | 5/2002 | Mills et al. | 711/103 |
| 6,498,750 B2 * | 12/2002 | Terada | 365/185.11 |
| 6,564,285 B1 * | 5/2003 | Mills et al. | 711/103 |
| 6,564,286 B2 * | 5/2003 | DaCosta | 711/103 |
| 6,591,330 B2 | 7/2003 | Lasser | |
| 6,678,785 B2 | 1/2004 | Lasser | |

(Continued)

FOREIGN PATENT DOCUMENTS

JP        56054558 A  *  5/1981

(Continued)

OTHER PUBLICATIONS

William M. Daley et al., (Digital Signatures Standards (DSS)), Federal Information processing Standards Publication, Dec. 15, 1988, pp. 1-23.*

(Continued)

*Primary Examiner* — Edward Dudek, Jr.
*Assistant Examiner* — Christopher Birkhimer
(74) *Attorney, Agent, or Firm* — Davis Wright Tremaine LLP (57) ABSTRACT

Upon the arrival at a memory device of one or more data chunks associated with respective logical addresses, each data chunk is assigned a signature, stored in a first location, and copied to a second location. The copy is assigned a signature that matches the signature of its parent data chunk. Before erasing a memory block that includes one or more data chunks, it first is verified that those data chunks have been copied, i.e., that copies of all the data chunks in the block, with matching signatures, exist in the memory device.

12 Claims, 4 Drawing Sheets

U.S. PATENT DOCUMENTS

| | | | |
|---|---|---|---|
| 6,931,381 B1 * | 8/2005 | Petit | 705/53 |
| 7,085,909 B2 * | 8/2006 | Ananthanarayanan et al. | 711/202 |
| 2001/0021958 A1 * | 9/2001 | Zink et al. | 711/103 |
| 2002/0016827 A1 | 2/2002 | McCabe et al. | |
| 2002/0021595 A1 * | 2/2002 | Terada | 365/200 |
| 2002/0073358 A1 * | 6/2002 | Atkinson | 714/21 |
| 2002/0129191 A1 * | 9/2002 | DaCosta | 711/103 |
| 2003/0095448 A1 * | 5/2003 | Ichige et al. | 365/200 |
| 2004/0044838 A1 * | 3/2004 | Nickel et al. | 711/104 |
| 2004/0080985 A1 * | 4/2004 | Chang et al. | 365/185.33 |
| 2004/0083333 A1 * | 4/2004 | Chang et al. | 711/103 |
| 2004/0083334 A1 * | 4/2004 | Chang et al. | 711/103 |
| 2004/0103241 A1 * | 5/2004 | Chang et al. | 711/103 |
| 2004/0117414 A1 * | 6/2004 | Braun et al. | 707/204 |
| 2004/0250074 A1 * | 12/2004 | Kilian-Kehr | 713/172 |
| 2005/0010764 A1 * | 1/2005 | Collet et al. | 713/165 |
| 2005/0066245 A1 * | 3/2005 | Von Wendorff | 714/732 |
| 2005/0108538 A1 * | 5/2005 | Howard et al. | 713/176 |
| 2006/0133157 A1 | 6/2006 | Murin et al. | |

FOREIGN PATENT DOCUMENTS

JP    2001-1254909 A    6/2001

OTHER PUBLICATIONS

Charles M. Kozierok, "ASCII Character Chart With Decimal, Binary and Hexadecimal Conversions", Version 2.2.2, Apr. 17, 2001, pp. 1-5, http://www.pcguide.com/res/tablesASCII-c.html.*

Webopedia, "NAND", Dec. 18, 2004, pp. 1-2, http://web.archive.org/web/20041218033437/http://webopedia.com/TERM/N/NAND.html.*

Webopedia, "EEPROM", Oct. 15, 2002, pp. 1-2, http://web.archive.org/web/20021015002202/http://www.webopedia.com/TERM/E/EEPROM.html.*

Webopedia, "Flash Memory", Apr. 11, 2001, pp. 1-2, http://web.archive.org/web/20010411011725/http://webopedia.com/TERM/F/flash_memory.html.*

* cited by examiner

METHOD OF MANAGING COPY OPERATIONS IN FLASH MEMORIES

This patent application claims the benefit of U.S. Provisional Patent Application No. 60/647,945, filed Jan. 31, 2005

FIELD AND BACKGROUND OF THE INVENTION

The present invention relates to a method and system for efficiently storing a stream of incoming data into a flash memory device, and, more particularly, to a method and system for managing copy operations required for the purpose of such storing.

U.S. Pat. No. 7,149,111 to Lasser et al., entitled "Method of Handling Limitations on the Order of Writing to a Nonvolatile Memory", and incorporated by reference for all purposes as if fully set forth herein, discloses a method and system for storing a stream of incoming data, such as a digital audio stream or a digital video stream, such that it is not practical or not desirable to write the incoming data immediately into their target location in the memory device. Instead, the method and system of Lasser et al. first store the incoming data into a first location, and later retrieve the data from that first location and write them a second time, this time into their desired target location.

The system of Lasser et al. writes the incoming sectors twice into the non-volatile memory. Therefore, that system must move each sector from its first location to a second location. The time at which such moving is to be done is flexible—the moving may be done close in time to the first writing, or the controller of the memory device may wait for a relatively long time before doing that moving. Still, it is always required, sooner or later, to move each sector of data from its first location to its second location. Following that move, the storage area used for the first writing is no longer needed and can be reclaimed to be used for new data.

It should be noted that the terms "first location" and "second location" do not necessarily refer to physically separate areas of the storage device. The first and second "locations" of different sectors may be intermixed, with no clear boundary between an area used only for first writing and an area used only for a second writing. Furthermore, a unit of storage may serve as a first location for some sectors at one point in time, and as a second location for some other sectors at a second point in time. Typically, however, it is convenient to group "first locations" and "second locations" together, as it simplifies their management. For the sake of simplicity, the explanations below assume such grouping is employed, but this should not be taken to limit the scope of the present invention in any way.

One problem facing the implementer of a memory device such as of Lasser et al. is how to tell that a certain sector written in a first write operation already has been moved to its second location, so that the physical location where the sector first was written can be reclaimed for new use. If the physical unit of data copied while moving the data from their first location to their second location had been an erase block (the smallest chunk of storage that can be erased in a single erase operation, typically 16 Kbytes to 256 Kbytes), then the solution would have been simple—immediately following the copying of a unit of data into its final location the controller of the memory device can erase the unit containing the first copy. Unfortunately, this is not the case. The typical unit of data copied while moving the data between their first and second physical locations is a sector (the smallest chunk of data exchanged between a host and a storage device, typically 512 bytes) or a page (the smallest chunk of physical storage that can be written in a single write operation into the storage device, typically 512 bytes to 2 Kbytes) or a small number of sectors or pages. When a chunk of data is copied to its new place, it is typically the case that other chunks of data in the same erase block are still not copied and therefore are still required to be kept. Erasing the block containing the copied data would destroy those un-copied chunks of data, and therefore should not be done.

In the explanations below it is assumed (for the sake of simplicity) that data are exchanged with the host and copied between physical storage locations in chunks equal to sectors. This in no way limits the scope of the present invention, which is fully applicable to all sizes of data chunks, including the case of variable sizes in which successive operations use different data chunk sizes.

Prior art flash management systems usually employ a technique of "delete marks" to mark chunks of data as no longer valid and/or no longer required to be kept. Such a mark is a logical flag of typically a single bit or a few bits, located in the overhead area associated with the sector data. For example, when a sector stored in a flash memory device is over-written by new data received from the host, the flash management system, in addition to storing the new data in a newly allocated location, also writes a delete mark into the overhead area associated with the old copy of the sector. This delete mark indicates that the data stored in that sector are not valid any more and can be erased if necessary. Typically, the flash management system checks (either periodically or upon a need for more free space) whether all the sectors of an erase block are marked as deleted. If this is the case, the block contains no useful data and is erased and reused for new data. One example of a flash management system employing this method of marking over-written sectors is taught in U.S. Pat. No. 5,404,485 to Ban. An example of a flash management system using the overhead area provided for each page in a NAND flash storage device (called "extra area" or "spare area") for storing control and management fields is taught by Lasser in U.S. Pat. No. 6,678,785. Both these patents are incorporated by reference for all purposes as if fully set forth herein.

One would expect that this method of "delete marks" could be extended to provide a solution to the problem presented above of telling whether data written to a first physical location had already been copied to a second physical location. Upon copying a sector of data, the flash management system would write a "copied mark" into the overhead area associated with that sector, and when all the sectors in a block are found to have this mark, the block can be erased and reused. This method of "copied marks" is referred to herein as the "marks method" or the "marking method".

Unfortunately, there are two principal disadvantages to using this marking method. The first disadvantage has to do with write performance. In NAND flash devices, which are the most common flash type for data storage, the data can only be written in pages. Even if one wants to write a single byte of data, it takes the device exactly the same time to write the single byte as when writing the full page. It is true there is some saving of time in the case of writing a single byte because one needs to transfer only one byte over the bus and into the device, compared to for example transferring 512 bytes when a full page is written. But in a flash device the internal write operation is typically much slower than the data transfer over the bus and into the device, and therefore the time it takes to write the mark is close to the time it takes to write the full sector of data. So by having to add a write operation of a mark for each sector of data, we spend significantly more time per each sector stored.

Consider the following numerical example. Assume we are using a NAND flash device with pages of 512 bytes. Assume the write time of a flash page is 200 microseconds, the read time of a page is 15 microseconds, and the transfer of the full page over the bus into or out of the device takes 30 microseconds. Without using the marks, each sector of data is first moved over the bus into the flash device, then written into a first location, then read back over the bus, then moved again over the bus into the device, and finally written into a second location. In all, this sums to two write operations, one read operation and three bus transfers=$2\times200+1\times15+3\times30=505$ microseconds per each sector stored. But when a mark is to be written into the first location after the above sequence in order to indicate the sector was already copied, we spend additional 200 microseconds, bringing the total number to 705 microseconds (and this while ignoring the small amount of time it takes to move the mark over the bus). So we see that there is a significant increase in the time spent per sector stored when marks are used. In this example it is approximately 40% slower to store a sector when using marks. If we take a Multi-Level Cell (MLC) NAND flash which has slow write time close to 1 millisecond (and assuming all other parameters remain the same), the effect of adding the marks is to increase the time per sector stored from approximately 2100 microseconds to approximately 3100 microseconds, almost 50% slower. This is a great disadvantage of the marks method.

The second major disadvantage of the marks method has to do with Partial Page Programming (PPP). PPP is a characteristic of a flash device that determines how many write operations are allowed to be made into a page before the block containing the page has to be erased. Typical values in commercially available NAND flash devices are between three and eight. However, MLC NAND devices have a PPP value of only one, which means we can only write once into a page before we have to erase the unit containing it. A flash management system may need to use some write operations for writing control fields associated with pages and erase blocks of a flash device where those fields are required for supporting the management algorithms, and therefore a flash management system may consume some of the available PPP operations.

Using "copy marks" consumes one write operation for each page used for the first storage of incoming sectors. This means there is one less write operation available for the flash management algorithms, and this puts limitations on the type of algorithms that may be employed. But it is even worse for flash devices having a PPP of one, such as MLC NAND. As stated above, such devices allow only a single write operation into a page. Therefore it is simply impossible to use the marks method in this case—the single allowed write operation must be used for writing the stored data, and when the time comes later (after the data were copied) to mark the page as copied, it is not allowed to perform the write operation for writing the mark.

We therefore conclude that the marks method for identifying pages as already copied from their first physical locations to their second physical locations has great disadvantages, and in some cases (i.e. MLC NAND) is not even possible to use.

There is thus a widely recognized need for, and it would be highly advantageous to have, a method that can identify copied sectors of a nonvolatile storage device without degrading the write performance of the memory device and without consuming an additional write operation.

SUMMARY OF THE INVENTION

The basic idea of the present invention is to write, along with data associated with a particular logical address, a "signature" that identifies the version of the data. Copies of the same data internal to a memory device share "matching" signatures, so that it can be determined whether data initially written to a first physical location have been copied to a second physical location, thereby freeing up the first physical location to be erased. Because the signature is written along with the data, the present invention is applicable to PPP=1 memory devices.

Therefore, according to the present invention there is provided a method of managing a memory device, including: (a) including a main memory in the memory device; (b) sending to the memory device, by a host of the memory device, a first data chunk; (c) assigning to the first data chunk a signature; (d) storing the first data chunk in a first location in the main memory; (e) copying the first data chunk to a second location in the main memory, thereby producing a copy of the first data chunk; and (f) assigning to the copy a signature that matches the signature of the first data chunk.

Furthermore, according to the present invention there is provided a memory device for storing a data chunk sent to the memory device by a host, including: (a) a memory; and (b) a controller operative: (i) to assign to the data chunk a signature; (ii) to store the data chunk in a first location in the memory; (iii) to copy the data chunk to a second location in the memory, thereby producing a copy of the data chunk; and (iv) to assign to the copy a signature that matches the signature of the data chunk.

The basic method of the present invention, for managing a memory device, starts by including a main memory in the memory device. A host of the memory device sends a first data chunk to the memory device. A signature is assigned to the first data chunk. The first data chunk is stored in a first location in the main memory. The first data chunk also is copied to a second location in the main memory, thereby producing a copy of the first data chunk. A signature is assigned to the copy that matches the signature of the first data chunk.

Preferably, the first data chunk is a data sector.

Preferably, the method is implemented for a plurality of first data chunks. The first data chunks are sent to the memory device by the host, assigned respective signatures, stored in respective first locations in the main memory and copied to respective second locations in the main memory, with each copy being assigned a respective signature that matches the signature assigned to the first data chunk of which that copy is a copy. Alternatively, all the copies are assigned a common signature that matches all the signatures of all the first data chunks. Under this alternative, preferably all the second locations are in a common block of the main memory and the common signature is associated with that block.

When the method is implemented for a plurality of first data chunks, preferably each first data chunk is associated with a respective logical address. In seeking to erase a block of the main memory that includes one or more of the first data chunks, for each first data chunk that is included in the block, all the copies that are associated with that first data chunk's logical address are sought. The block is erased only if, for each first data chunk that is included in the block, one of the copies that is associated with that first data chunk's logical address has a signature that matches the signature of that first data chunk.

Preferably, the first data chunk is associated with a logical address. The host sends the memory device a second data chunk that also is associated with that logical address and assigns the second data chunk a signature such that the signature of the first data chunk and the signature of the second data chunk together indicate that the second data chunk replaces the first data chunk. More preferably, the second data chunk is stored in a third location in the main memory and also is copied to a fourth location in the memory, thereby producing a copy of the second data chunk. The copy of the second data chunk is assigned a signature that matches the signature of the second data chunk. Most preferably, in seeking to erase a block of the main memory that includes one of the data chunk, all the copies that are associated with the logical address are sought. A necessary condition for allowing the block to be erased is that the signature of one of the copies matches the signature of that one data chunk. Also most preferably, the signature of the second data chunk is either an immediate cyclical successor or an immediate cyclical predecessor of the signature of the first data chunk.

Preferably, the main memory is a flash memory.

Preferably, the signature of the first data chunk is stored in the main memory along with the first data chunk.

Optionally, an auxiliary memory separate from the main memory is included in the memory device and either the signature of the first data chunk or the signature of the copy of the first data chunk is stored in the auxiliary memory. Most preferably, the auxiliary memory is a random access memory.

Preferably, the signature that is assigned to the copy of the first data chunk is identical to the signature of the first data chunk.

Although the primary use of the present invention is to provide "copy mark" equivalents that work even for PPP=1 memory devices, it will be clear to those skilled in the art that the present invention also provides the equivalent of "erase marks" for PPP=1 memory devices.

Therefore, according to the present invention there is provided a method of managing a memory device that includes a memory, including the steps of: (a) successively sending to the memory device, by a host of the memory device, a first data chunk and a second data chunk, both the data chunks being associated with a common logical address; (b) assigning to each data chunk a respective signature, wherein the signature of the first data chunk and the signature of the second data chunk together indicate that the second data chunk replaces the first data chunk; (c) storing the data chunks in respective locations in the memory; and (d) upon receiving from the host a request to read data associated with the logical address, sending to the host the data chunk whose signature indicates that, of the two data chunks, that data chunk was received second by the memory device.

Furthermore, according to the present invention there is provided a memory device for storing a first data chunk and a second data chunk sent to the memory device successively by a host, both data chunks being associated with a common logical address, the memory device including: (a) a memory; and (b) a controller operative: (i) to assign to each data chunk a respective signature, wherein the signature of the first data chunk and the signature of the second data chunk together indicate that the second data chunk replaces the first data chunk, (ii) to store the data chunks in respective locations in the memory, and (iii) upon receiving from the host a request to read data associated with the logical address, to send to the host the data chunk whose signature indicates that, of the two data chunks, that data chunk was received second by the memory device.

When the present invention is used in the context of Lasser et al., U.S. Pat. No. 7,149,111, data are stored in a first location in a memory device using a single write operation, rather than using two write operations as would be necessary if the "copied marks" method were used. Similarly, the internal copy of the data to a second location requires only one write operation. Nevertheless, because the two versions of the data have matching signatures, it is possible to verify whether the copying has been done without doing a bit-by-bit comparison of the two versions of the data. Therefore, the present invention is generalized as follows:

According to the present invention there is provided a method of managing a memory device that includes a memory, including the steps of: (a) sending to the memory device a sector of data; (b) storing the sector of data in a first location in the memory using a single write operation; and (c) copying the sector of data to a second location in the memory using a single write operation; wherein the storing and the copying are effected in a manner that allows verification that the copying has been effected without reading all of the data from either the location.

Furthermore, according to the present invention there is provided a method of managing a memory device that includes a memory, including the steps of: (a) sending to the memory device a plurality of sectors of data; (b) storing the plurality of sectors of data in a first page of the memory using a single write operation; and (c) copying the plurality of sectors of data to a second page of the memory using a single write operation; wherein the storing and the copying are effected in a manner that allows verification that the copying has been effected without reading all of the data from either the page.

Furthermore, according to the present invention there is provided a memory device including: (a) a memory; and (b) a controller operative: (i) to store a sector of data in a first location in the memory using a single write operation, and (ii) to copy the sector of data to a second location in the memory using a single write operation; wherein the storing and the copying are effected in a manner that allows verification that the copying has been effected without reading all of the data from either the location.

Furthermore, according to the present invention there is provided a memory device including: (a) a memory; and (b) a controller operative: (i) to store a plurality of sectors of data in a first page of the memory using a single write operation, and (ii) to copy the plurality of sectors of data to a second page of the memory using a single write operation; wherein the storing and the copying are effected in a manner that allows verification that the copying has been effected without reading all of the data from either the page.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and system for storing data in a nonvolatile memory such as a flash memory. Specifically, the present invention can be used to guarantee that data that need to be copied from one physical location in the memory to another physical location are not erased before the copying is effected.

The principles and operation of nonvolatile memory management according to the present invention may be better understood with reference to the drawings and the accompanying description.

The present invention is based on associating with each copy of a sector a control field that acts as a signature. This signature uniquely identifies the version of the sector data by being different on successive updates of the sector data. Each time a sector is written into a flash memory device and is stored into its first location, the flash management system assigns a signature value to that data. By "signature" is meant a numerical value that is guaranteed to be different from the corresponding field associated with any previous version of the same logical sector currently existing within the memory device. By "logical sector" is meant the sector as seen and addressed by the host of the memory device, such that the host is able to repeatedly update or over-write a given sector address as if that sector address always represents the same sector, while in reality every update of the sector's data may be stored within the storage system in a different physical location. Flash management systems providing an image of logical sectors (or "virtual sectors") are taught in Ban (U.S. Pat. No. 5,404,485 already mentioned above), in Lasser (U.S. Pat. No. 6,678,785 already mentioned above), in U.S. Pat. No. 5,937,425 to Ban, and in U.S. Pat. No. 6,591,330 to Lasser.

It is typically the case that at most only two versions of a logical sector exist within the memory device at any given time. One version is the one being over-written by the current write request, and a second version is the new data provided by the current operation. In some flash management systems there may be cases in which more than two versions of a sector are kept together, but even in these cases the number of kept versions is small. Therefore we may usually use a simple method for generating a signature. For example, the signature field can be just a few bits long (for example 3 bits), and successive values are generated by cyclically incrementing the value of the signature for each new version. In other words, the available values of a signature are {0,1,2,3,4,5,6,7}. When a new version of a sector is received, we look up the signature value in the previous version currently stored, increment it by one, and use the result as the new signature. If the previous signature is seven, the new one is zero, as we look at the sequence of values as a cyclic group. We shall refer to this type of signature as "generation signature" or simply as "generation", as it can be looked at as if it represents the "generation" of the data, with higher generation value associated with newer versions of the data (of course the analogy breaks down when moving from seven to zero).

When a sector is later copied from its first physical location to its second physical location, the sector keeps its signature field. In other words, the copy of a sector in the second location has the same signature value as the sector had in its first location. The advantage of the current invention is that the signature field provides the functionality of a "copy mark", without suffering from the disadvantages of the marks method.

First let us see how the marks functionality is provided by using signatures. Whenever the flash management system has to find out whether a given sector in a first storage location was already copied so that its containing block may be erased and reused, the flash management system looks for the signature field associated with the sector in its first location and for the signature field associated with the same logical sector in its second location. If both values match, then the sector was already copied and can be erased. If the values do not match, then the sector was not copied yet and it is still required to keep the sector in its first location. One may look at this method as an efficient sectors comparison operation. Obviously one can solve the problem at hand by reading out the full data of the two versions of the logical sector and comparing each and every byte of them. This will tell us whether the two copies are identical (in which case the first location can be erased) or not identical (in which case the first location should not be erased yet). However, such full data comparison is highly inefficient and is not a practical solution. The current invention provides an equivalent result but with much lower cost—only a single field and not the full sector is compared, and only a single field and not the full sector has to be read out over the bus.

Figure 1:
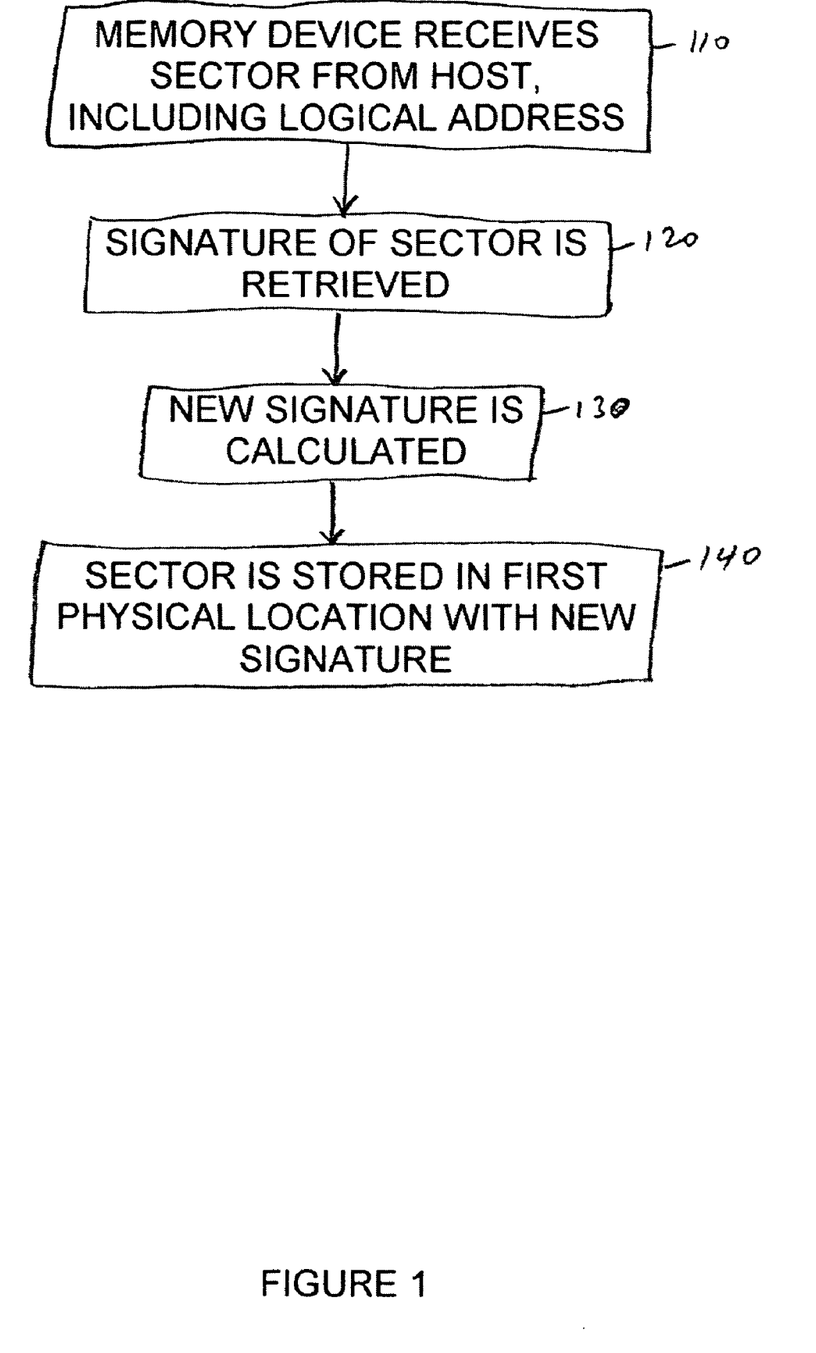
FIG. 1 is a flow chart of the storage of a sector.

Referring now to the drawings, FIG. 1 shows what is done in a memory device using the method of the present invention when a sector is sent by a host computer to be stored in the memory device. In step 110 the memory device receives the sector data from the host, accompanied by the logical sector address of the data. In step 120 the signature associated with the current version of that logical sector is retrieved. This value may be retrieved from tables kept in the RAM of the controller of the storage system, or the value may be read from the flash memory. In step 130 a new value of a signature is computed, to be associated with the new version of the logical sector. If a generation-type signature is used, the calculation is just the cyclic incrementing of the previous signature. In step 140 the new version of the sector is stored in a first location, accompanied by the newly calculated signature.

Figure 2:
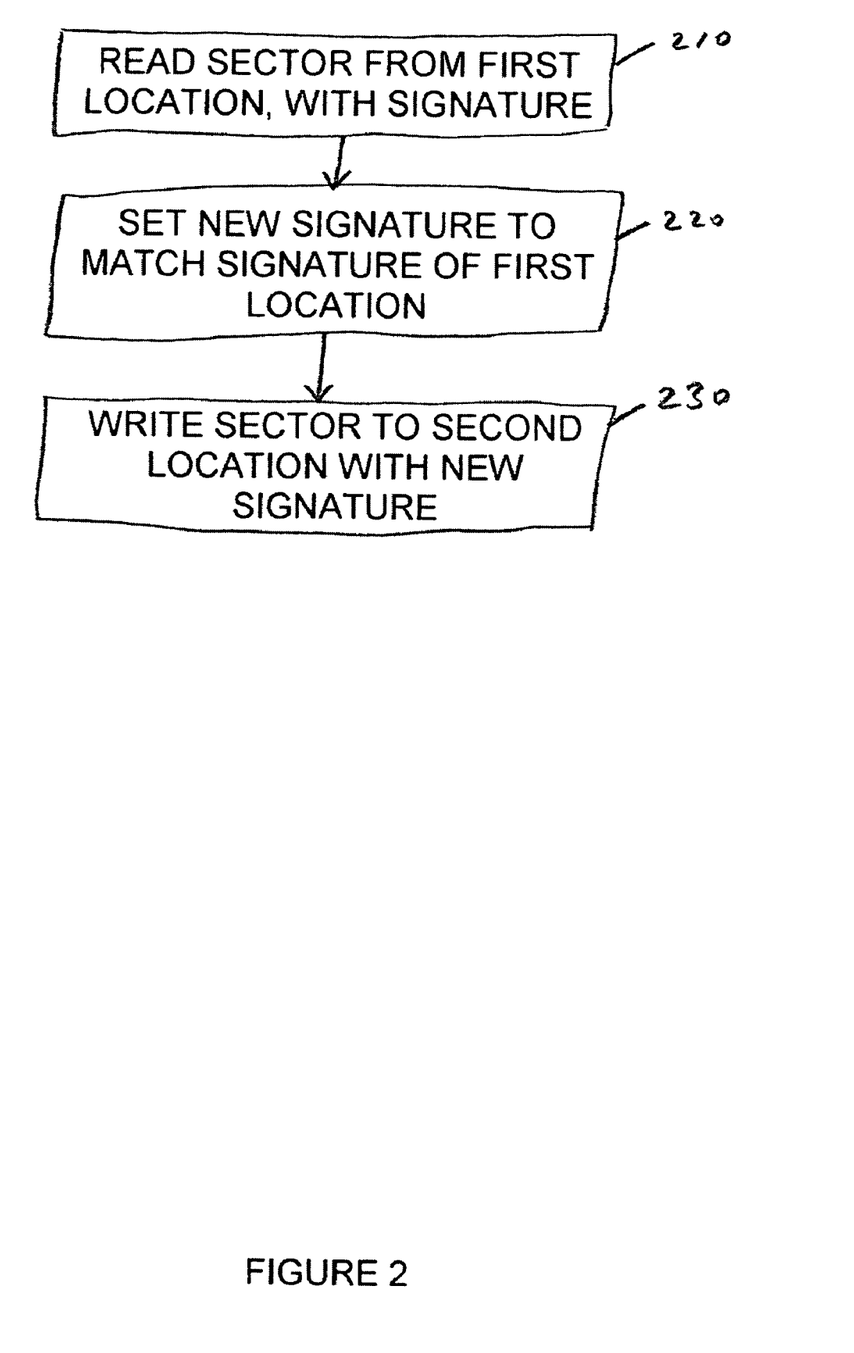
FIG. 2 is a flow chart of the copying of a sector.

FIG. 2 shows what is done in a memory device using the method of the present invention when a sector residing in its first location is copied into its second location. In step 210 the sector to be copied is read from its first location, together with its signature field. In step 220 the signature value for the second location is set to match the signature in the first location. In step 230 the sector is written into its second location, accompanied by the new signature value.

Figure 3:
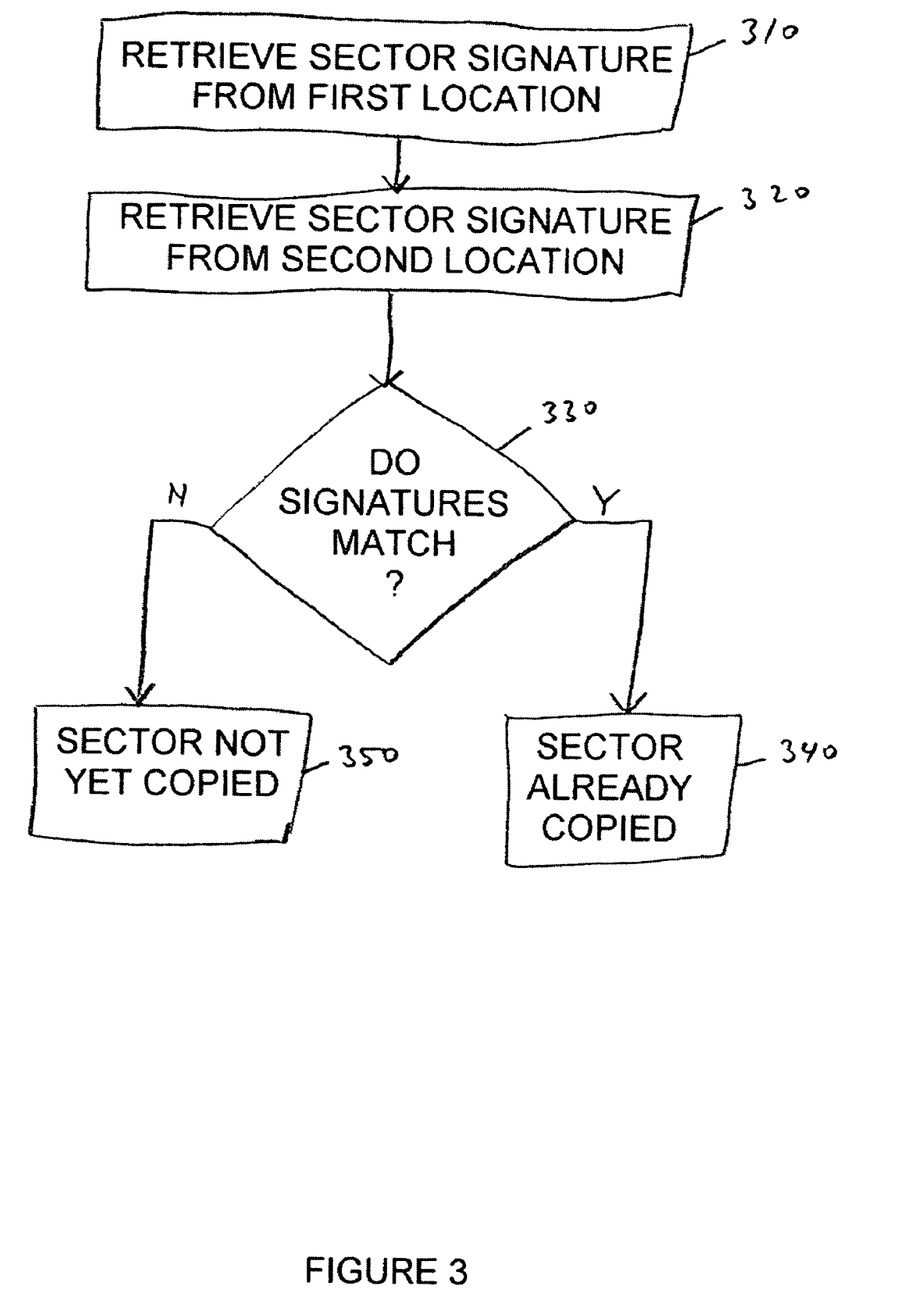
FIG. 3 is a flow chart of confirmation of the copying of FIG. 2.

FIG. 3 shows what is done in a memory device using the method of the present invention when a determination has to be made whether a sector in a first location was already copied into a second location. In step 310 the signature value of the sector in the first location is retrieved. In step 320 the signature value of the sector in the second location is retrieved. Both retrievals may be from tables in RAM or from the flash memory. In step 330 the two retrieved values are checked to see if they match. If they do match, in step 340 we conclude the sector was already copied and is not needed any more in the first location. If they do not match, in step 350 we conclude the sector was not copied yet and should still be kept in the first location.

The above algorithm solves the copying identification problem without suffering from the disadvantages of the marks method:

A. No additional write operation is added by the method of the present invention and therefore no performance penalty is incurred. Even though a signature field is written for each version of the data, this field is always written during the same write operation as the data and therefore adds no extra time. This is so because in NAND flash the basic chunk for writing is a page, and regardless of the number of bytes updated in the page in a write operation the operation takes the same time. This is different from the marks method in which the mark cannot be written into the first storage location together with the data and must be written in a separate operation.

B. No additional write operation is added by the method of the present invention and therefore no PPP characteristics are consumed. The method of the present invention can be used even with MLC NAND devices that have PPP=1. Again this should be contrasted with the marks method in which the writing of the mark into the first storage location must be carried out as a separate write operation.

Following are a few notes regarding some variations on the above method which also are within the scope of the present invention:

1. It may have appeared in the above explanations that the same values of signatures are used in the first location and in the second location of a sector. This is however not strictly necessary. The values of the signatures in the two locations may differ, as long as there is sufficient correspondence between the two fields to allow the flash management system to find out whether a first signature value in a first location matches a second signature value in a second location. For example, the signature values in the second location may be set to be the logical bit-by-bit complement of the signature values in the first location. Wherever we use the term "matching signatures" herein it should be interpreted to include not just equality of values but also any such correspondence allowing to determine whether a first signature value in a first location matches a second signature value in a second location.

2. The above explanations assumed that each sector in a second location has a signature field stored with it. This is however not strictly necessary. It may be more efficient to group several sectors in their second physical location to use a joint signature field. For example, it may be efficient to have a second location signature field associated with a unit such as an erase block, in which case each sector within the erase block is understood to have a signature value that is equal to the signature value associated with the erase block, even though there is no signature field within the sector itself. Such a scheme is useful when the copying process from first location to second location is done in unit chunks and not independently for each sector. Wherever in this application we say that a signature field is associated with and written with a sector in a second location, it should be interpreted to include not just the case of each sector having a directly associated signature field but also the case of several sectors sharing a signature field so that for at least some sectors the signature field is only indirectly associated, for example by the signature field being associated directly with an erase block rather than with the sectors of that erase block.

3. The above explanations assumed that only two versions of a sector ever exist within the storage system. This indirectly implies that by the time the next update to a sector is received the system already has copied the last version from its first location to its second location, and already has erased the version that immediately preceded the last version. This is however not strictly necessary. The methods of the present invention can easily be extended to apply to the case in which a new update to a logical sector may arrive while the logical sector still has two previous versions within the storage system. In such case we may do one of the following:

i. Give up the copying of the previous version because it is no longer required. Store the newest version in a first location and then make sure it is copied according to the methods of the present invention. Care must be taken to make sure the skipped version (that will never be copied) is correctly identified as such, for example by observing the order of the versions in the first storage locations and skipping the ones that are not the most recent.

ii. Assign the new version a still higher signature value, and do not skip the copying of the previous version according to the methods of the present invention. Later the still newer version will be identified as new version (because of its different signature value) and will be copied to its second location according to the methods of the present invention. While this approach wastes an unnecessary copy operation (as it copies data we already know was superseded by newer data), it may be simpler to implement.

4. The above explanations should not be mistaken to apply only to the case in which each sector is written into a separate page. This is not so. The present invention is fully applicable to memory devices in which a few logical sectors are stored within the same physical page. This may be the case where the flash device has pages of 2 Kbytes while the host exchanges sectors of 512 bytes with the storage system, in which case four sectors are stored together in a page. In such storage systems the methods of the present invention should be separately applied to each sector, with each sector having its own signature field, regardless of the grouping of sectors into pages. One point of difference that may exist in such case is that a page containing more than one sector can be written in a single operation rather than each sector being written in a separate operation.

Figure 4:
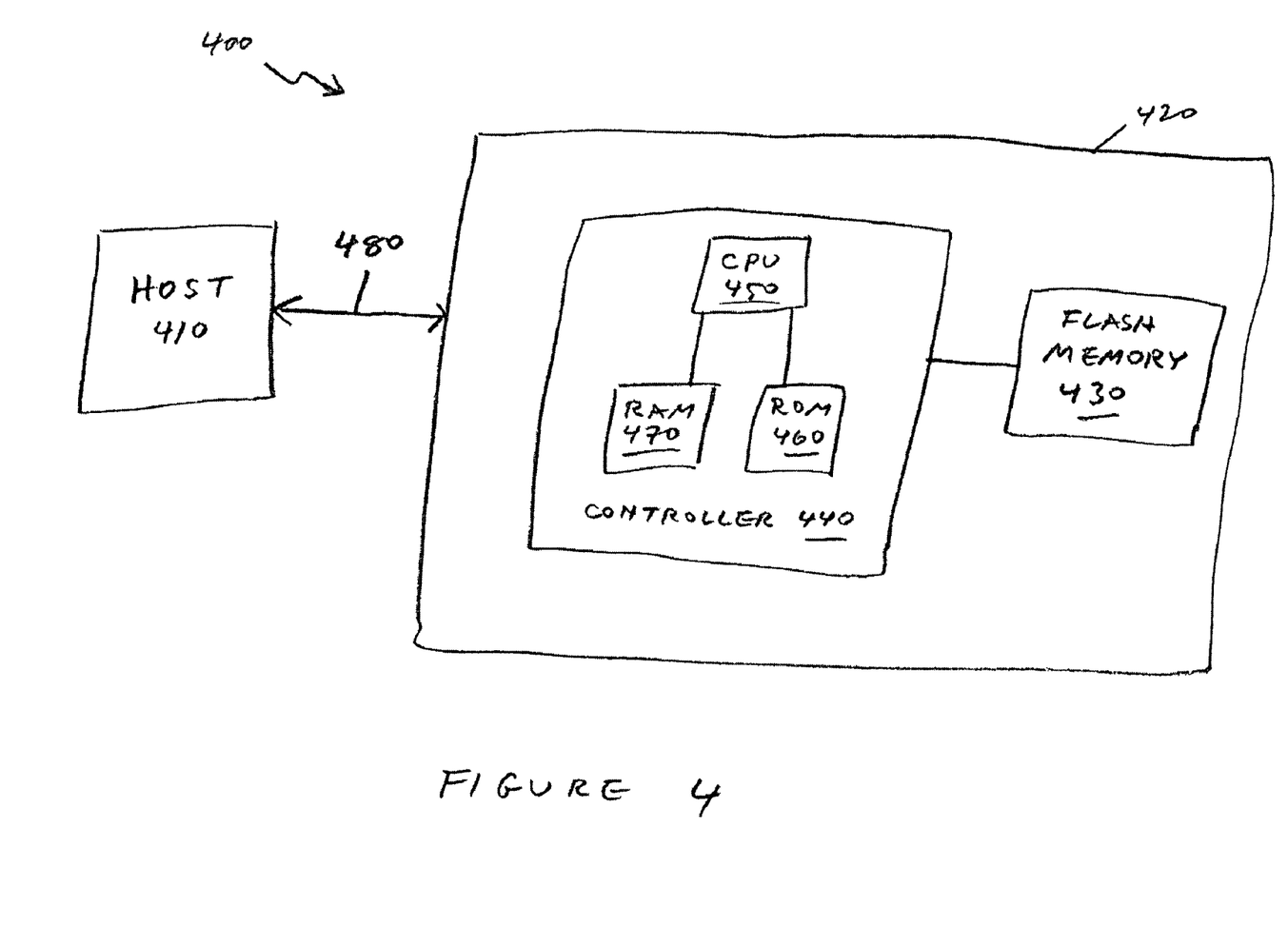
FIG. 4 is a high-level schematic block diagram of a system of the present invention.

FIG. 4 is a high-level schematic block diagram of a system 400 that uses the methods of the present invention. System 400 includes a host computer 410 that acts as a source of data and a flash memory device 420 for storing that data, with the data being sent from host computer 410 to memory device 420 via a host interface 480. Memory device 420 includes a flash memory 430 in which the data are stored and a controller 440 that is responsible for the proper storage of the data in flash memory 430. Controller 440 in turn includes a CPU 450, a ROM 460 (in which the code executed by the CPU is stored), and a RAM 470 that is used by CPU 450 for supporting its code execution. This block diagram is representative of typical nonvolatile storage modules, such as SecureDigital™ flash memory cards or portable USB flash drives. In system 400 the methods of the present invention, including writing data to a first physical location, copying the same data to a second physical location, and generating and storing the signature fields, are all performed by controller 440, or more precisely—by CPU 450 executing code from ROM 460. This is however not the only system architecture possible for using the present invention. For example, it is also possible that the methods of the invention are implemented by code executed in host computer 410, as will be the case when the storage module is an on-board NAND flash device and there is no stand-alone controller. Another possibility is that the methods of the invention are partially implemented by host computer 410 and partially implemented by controller 440. All these architectures and many others are within the scope of the present invention.

Apart from the methodology of the present invention, controller 440 manages flash memory 430 substantially as taught in the prior art, for example in U.S. Pat. Nos. 5,404,485, 5,937,425, 6,591,330 and 6,678,785 cited above.

While the invention has been described with respect to a limited number of embodiments, it will be appreciated that many variations, modifications and other applications of the invention may be made.

What is claimed is:

1. A method of managing a memory device, comprising:
(a) including a flash memory in the memory device;
(b) sending to the memory device, by a host of the memory device, a first data chunk, said first data chunk being one version of data among one or more versions of data sharing a common logical address;
(c) providing a signature to identify the version of said first data chunk, wherein the signature is generated by cyclically incrementing a signature of a prior version of said first data chunk;
(d) storing said first data chunk in a first erase block in said flash memory;
(e) copying said first data chunk to a second erase block in said flash memory, thereby producing a copy of said first data chunk with the common logical address, said copy of said first data chunk being the same version as the first data chunk;
(f) assigning to said copy a signature that matches said signature of said first data chunk;
wherein a plurality of said first data chunks are sent to the memory device, assigned respective signatures, stored in respective first erase blocks and copied to respective second erase blocks, and wherein each said copy is assigned a respective said signature
wherein each said first data chunk has a respective logical address, the method further comprising the step of:
(g) in seeking to erase an erase block of said flash memory that includes at least two of said first data chunks:
(i) for each said first data chunk that is included in said erase block of said flash memory: seeking all said copies that have said logical address of said each first data chunk; and
(ii) erasing said erase block of said flash memory only if, for each said first data chunk that is included in said erase block of said flash memory, said signature of one of said copies that has said logical address of said each data chunk matches said signature of said each data chunk.

2. The method of claim 1, wherein said first data chunk is a data sector.

3. The method of claim 1 wherein the flash memory is NAND flash memory.

4. The method of claim 3 wherein the NAND flash memory is Multi-Level Cell NAND flash memory.

5. The method of claim 1 wherein the flash memory has a Partial Page Programming value of eight or less.

6. A method of managing a memory device, comprising:
(a) including a flash memory in the memory device;
(b) sending to the memory device, by a host of the memory device, a first data chunk, said first data chunk being one version of data among one or more versions of data sharing a common logical address;
(c) providing a signature to identify the version of said first data chunk, wherein the signature is generated by cyclically incrementing a signature of a prior version of said first data chunk;
(d) storing said first data chunk in a first erase block in said flash memory;
(e) copying said first data chunk to a second erase block in said flash memory, thereby producing a copy of said first data chunk with the common logical address, said copy of said first data chunk being the same version as the first data chunk;
(f) assigning to said copy a signature that matches said signature of said first data chunk;
wherein a plurality of said first data chunks are sent to the memory device, assigned respective signatures, stored in respective first locations and copied to respective second locations, and wherein all said copies are assigned a common signature that matches all said respective signatures of said first data chunks
wherein each said first data chunk has a respective logical address, the method further comprising the step of:
(g) in seeking to erase an erase block of said flash memory that includes at least one two of said first data chunks:
(i) for each said first data chunk that is included in said erase block of said main flash memory: seeking all said copies that have said logical address of said each first data chunk; and
(ii) erasing said erase block of said main memory only if, for each said first data chunk that is included in said erase block of said flash memory, said signature of one of said copies that have said logical address of said each data chunk matches said signature of said each data chunk.

7. The method of claim 6 wherein the flash memory is a Multi-Level Cell NAND flash memory that has a Partial Page Programming value of one.

8. The method of claim 6 wherein the first data chunk is a data sector.

9. A memory device for storing a first data chunk, said first data chunk being one version of data among one or more versions of data sharing a common logical address, said first data chunk being sent to the memory device by a host, comprising:
(a) a flash memory having a plurality of erase blocks, an erase block storing a plurality of data chunks; and
(b) a controller operative:
(i) to assign to the first data chunk a signature identifying the version of the data chunk, wherein the signature is generated by cyclically incrementing a signature of a prior version of the data chunk;
(ii) to store the first data chunk in a first erase block in said memory;
(iii) to copy the first data chunk to a second erase block in said memory, thereby producing a copy of the first data chunk with the common logical address said copy of said first data chunk being the same version as the first data chunk;
(iv) to assign to said copy a signature that matches said signature of the first data chunk;
(v) to subsequently, prior to erase of the first erase block, seek all copies of the first data chunk having the signature; and
(vi) to only erase the first erase block after the copy of the first data chunk in the second erase block having the signature is found.

10. The memory device of claim 9 wherein the flash memory is a NAND flash memory.

11. The memory device of claim 10 wherein the NAND flash memory is a Multi-Level Cell NAND flash memory.

12. The memory device of claim 11 wherein the flash memory has a Partial Page Programming value of eight or less.

* * * * *

UNITED STATES PATENT AND TRADEMARK OFFICE
CERTIFICATE OF CORRECTION

PATENT NO. : 8,341,371 B2  
APPLICATION NO. : 11/219826  
DATED : December 25, 2012  
INVENTOR(S) : Lasser It is certified that error appears in the above-identified patent and that said Letters Patent is hereby corrected as shown below:

In the Claims

Column 12, line 10, delete "one."

Signed and Sealed this  
Third Day of June, 2014

Michelle K. Lee  
*Deputy Director of the United States Patent and Trademark Office*